(12) United States Patent
Terwilliger et al.

(10) Patent No.: US 12,509,246 B2
(45) Date of Patent: Dec. 30, 2025

(54) COLLECTION OF BOIL OFF GAS AT AIRPORT GATE

(71) Applicant: Raytheon Technologies Corporation, Farmington, CT (US)

(72) Inventors: Neil J. Terwilliger, Cheshire, CT (US); Marc J. Muldoon, Marlborough, CT (US)

(73) Assignee: RTX CORPORATION, Farmington, CT (US)

( * ) Notice: Subject to any disclaimer, the term of this patent is extended or adjusted under 35 U.S.C. 154(b) by 267 days.

(21) Appl. No.: 18/102,154

(22) Filed: Jan. 27, 2023

(65) Prior Publication Data

US 2024/0253821 A1 Aug. 1, 2024

(51) Int. Cl.
*B64F 1/28* (2006.01)
*B64D 37/30* (2006.01)
*B64F 5/40* (2017.01)

(52) U.S. Cl.
CPC ............... *B64F 1/28* (2013.01); *B64D 37/30* (2013.01); *B64F 5/40* (2017.01)

(58) Field of Classification Search
CPC combination set(s) only.
See application file for complete search history.

(56) References Cited

U.S. PATENT DOCUMENTS

| | | | |
|---|---|---|---|
| 9,255,664 B2 | 2/2016 | Gerstler et al. | |
| 9,701,416 B2 * | 7/2017 | Epstein | F02C 7/224 |
| 9,982,843 B2 * | 5/2018 | Kawai | F17C 13/025 |
| 10,006,363 B2 | 6/2018 | Delgado, Jr. et al. | |
| 11,780,597 B2 * | 10/2023 | Swann | B64D 27/10 244/135 R |
| 2013/0186059 A1 * | 7/2013 | Epstein | F02C 3/22 60/260 |
| 2013/0340474 A1 * | 12/2013 | Jung | F02M 21/0215 62/611 |
| 2014/0174105 A1 | 6/2014 | Gerstler et al. | |
| 2015/0330575 A1 * | 11/2015 | Epstein | F17C 13/00 62/48.1 |
| 2016/0025339 A1 | 1/2016 | Kamath et al. | |
| 2018/0134413 A1 * | 5/2018 | Halsey | B64F 1/352 |
| 2022/0131165 A1 * | 4/2022 | Ballantine | B64F 1/36 |
| 2023/0159185 A1 * | 5/2023 | Minas | B64F 1/28 244/135 A |

FOREIGN PATENT DOCUMENTS

| | | | | |
|---|---|---|---|---|
| WO | WO-2014105326 A1 * | 7/2014 | | F17C 13/00 |
| WO | WO-2022023648 A1 * | 2/2022 | | F02C 3/20 |
| WO | 2022049335 A1 | 3/2022 | | |

OTHER PUBLICATIONS

Extended European Search Report for European Application No. 24154533.4 mailed May 31, 2024.

* cited by examiner

*Primary Examiner* — Assres H Woldemaryam
(74) *Attorney, Agent, or Firm* — Carlson, Gaskey & Olds, P.C.

(57) ABSTRACT

A cryogenic fueled aircraft propulsion maintenance system includes a fuel system of an aircraft, the fuel system includes a cryogenic fuel tank that is configured to maintain the fuel in a liquid phase during aircraft operating conditions, a gas collection system where boil off gas from the fuel system is collected, and a fuel reliquification system that is configured to receive boil off gas from the gas collection system and transform the boil off gas into a liquid phase as liquid fuel.

12 Claims, 2 Drawing Sheets

COLLECTION OF BOIL OFF GAS AT AIRPORT GATE

TECHNICAL FIELD

The present disclosure relates generally to an alternate fuel turbine engine for aircraft and more specifically to a system and means of containing gaseous fuel during times of inactivity.

BACKGROUND

Reduction and/or elimination of carbon emissions generated by aircraft operation is a stated goal of aircraft manufacturers and airline operators. Alternate fuels have been proposed including ammonia, hydrogen and natural gas. Some alternate fuels require storage at temperatures well below ambient conditions to maintain them in a liquid form. Accordingly, aircraft will include operating systems that provide the required pressures and temperatures to maintain the fuel in desired phase during flight operation. However, during periods where the aircraft is not operating, such as during loading of passengers or extended layovers, some boil off of the fuels may occur. The boil off can be significant and result in substantial fuel loss that incur additional costs.

Turbine engine manufacturers continue to seek further improvements to engine performance including improvements to reduce environmental impact while improving propulsive efficiencies.

SUMMARY

A cryogenic fueled aircraft propulsion maintenance system according to an exemplary embodiment of this disclosure, among other possible things includes a fuel system of an aircraft, the fuel system includes a cryogenic fuel tank that is configured to maintain the fuel in a liquid phase during aircraft operating conditions, a gas collection system where boil off gas from the fuel system is collected, and a fuel reliquification system that is configured to receive boil off gas from the gas collection system and transform the boil off gas into a liquid phase as liquid fuel.

In a further embodiment of the foregoing, the fuel liquification system is separate from the aircraft.

In a further embodiment of any of the foregoing, the cryogenic fueled aircraft propulsion maintenance system further includes a conduit within the aircraft that extends from an externally accessible outlet to the cryogenic fuel tank for communicating boil off gas outside the aircraft.

In a further embodiment of any of the foregoing, the gas collection system is mounted within the aircraft proximate the cryogenic fuel tank and the conduit extends to the gas collection system from the externally accessible outlet.

In a further embodiment of any of the foregoing, a portion of the gas collection system is external to the aircraft and is in communication with the cryogenic fuel tank.

In a further embodiment of any of the foregoing, the cryogenic fueled aircraft propulsion maintenance system further includes an externally accessible power connection for communicating power from a source external to the aircraft to the fuel system and gas collection system on the aircraft.

In a further embodiment of any of the foregoing, the cryogenic fueled aircraft propulsion maintenance system includes a pump that is configured to communicate boil off gas from the aircraft to the fuel liquification system. The power source external to the aircraft provides power to the pump.

In a further embodiment of any of the foregoing, the cryogenic fuel includes one of hydrogen, ammonia, or liquid natural gas.

A cryogenic fueling system for an aircraft according to another exemplary embodiment of this disclosure, among other possible things includes a fuel reliquification system where collected boil off gas is transformed into a liquid fuel, a coupling that is configured for connecting to an external location of an aircraft for receiving boil off gas from an aircraft fuel system, and a cryogenic fuel storage system for receiving and storing the liquid fuel from the fuel reliquification system.

In a further embodiment of the foregoing, the cryogenic fueling system for an aircraft includes a gas collection system where boil off gas from a hydrogen-based fuel system is collected. The gas collection system includes the coupling that is configured for connecting to an externally accessible location of an aircraft for receiving a gas phase of a hydrogen-based fuel.

In a further embodiment of any of the foregoing, the gas collection system and fuel liquification system are ground based and fixed relative to an airport gate or other parking area.

In a further embodiment of any of the foregoing, the gas collection system and the fuel liquification system are supported on a mobile vehicle.

In a further embodiment of any of the foregoing, the cryogenic storage system includes a portion that is configured for storing a cryogenic fuel in a gaseous phase.

In a further embodiment of any of the foregoing, the cryogenic fueling system for an aircraft includes a fuel pumping system for communicating a cryogenic fuel to an aircraft fuel system.

In a further embodiment of any of the foregoing, the cryogenic fueling system for an aircraft includes a power system that is configured to couple to the aircraft fuel system for providing power independent of aircraft power to power the aircraft fuel system, the gas collection system and the fuel reliquification system.

In a further embodiment of any of the foregoing, the cryogenic fueling system for an aircraft includes a power generation system that is configured to generate power that utilizes the boil off gas from the aircraft.

A method of recovering boil off gases from aircraft cryogenic fuel system, the method, according to another exemplary embodiment of this disclosure, among other possible things includes collecting boil off gases from a cryogenic fuel tank of an aircraft, communicating the collected boil off gases to a reliquification system that is separate from the aircraft, transforming the collected boil off gases into a liquid phase of the cryogenic fuel, and storing at least a portion of the liquid phase of the cryogenic fuel in a cryogenic fuel storage system independent of the aircraft.

In a further embodiment of the foregoing, collecting of the boil off gases includes coupling a conduit between an externally accessible coupling of the aircraft and a ground-based fuel reliquification system.

In a further embodiment of any of the foregoing, the method includes powering an aircraft cryogenic fuel system with a ground-based power source and collecting the boil off gases with a gas collection system that is powered by the ground-based power source.

In a further embodiment of any of the foregoing, the method includes communicating cryogenic liquid fuel to the aircraft fuel system from the cryogenic fuel storage system.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
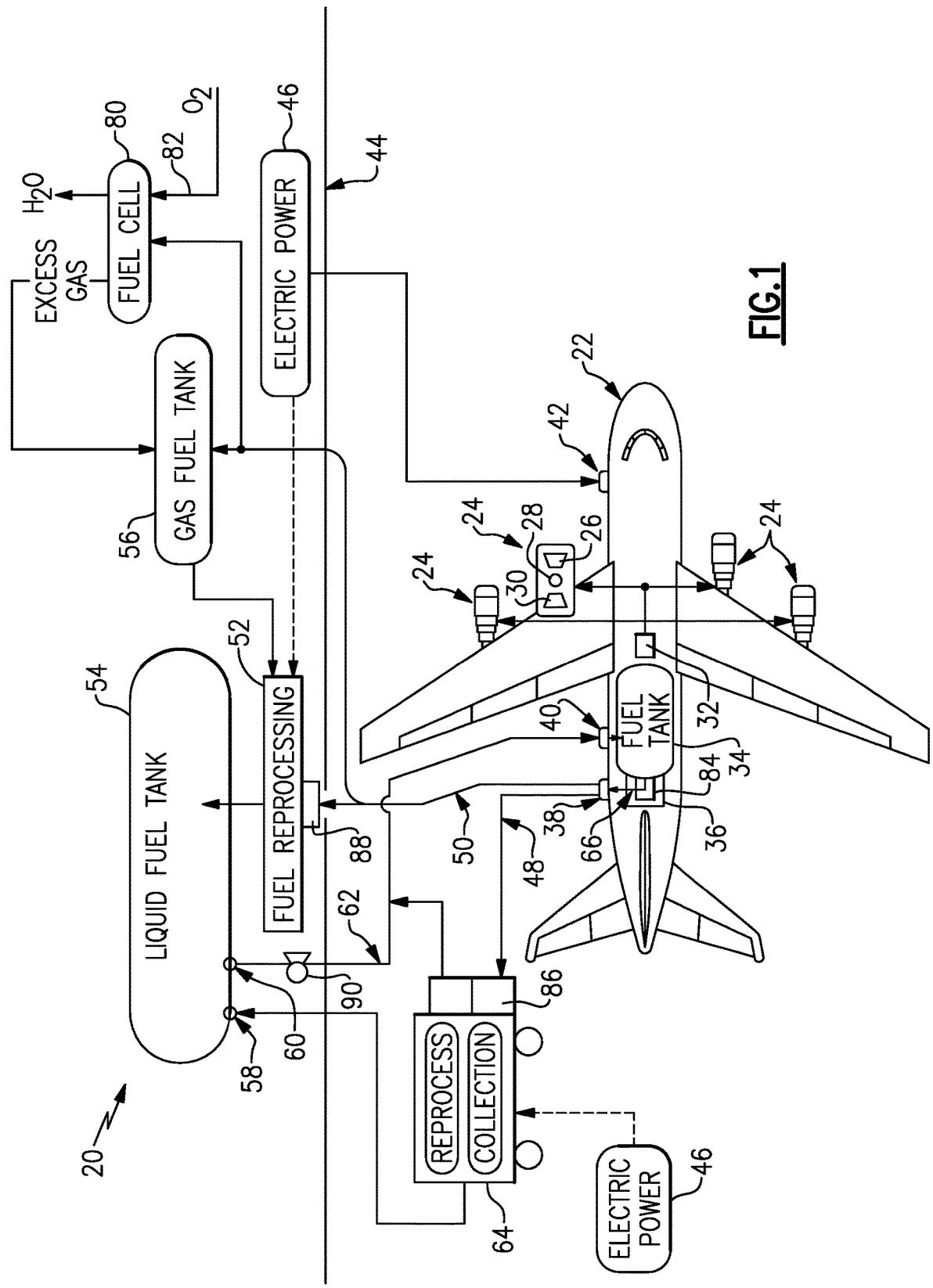
FIG. 1 is a schematic view of a schematic view of an example aircraft cryogenic fueling system.

FIG. 1 schematically illustrates an aircraft 22 located proximate a gate 44 or other aircraft parking area that is equipped with a cryogenic boil off fuel collection and reprocessing system 20. The replacement of hydrocarbon fuels with alternate fuels such as hydrogen provide a potential for significant reduction carbon emissions. However, most of such alternate fuels exist in a gaseous phase at typical ambient pressures and temperatures. Accordingly, low temperatures are required for storage in a liquid phase. Such cryogenic fuels are stored in a liquid phase on-board the aircraft 22.

Maintaining the cryogenic fuel in liquid form requires systems to maintain temperatures well below ambient temperatures. Even with such cryogenic systems, some amount of the liquid fuel changes phase into a gaseous form. An aircraft fuel system 32 distributes fuel to the engines 24 and includes features that accommodate and use the gaseous fuel during aircraft operation. However, when the aircraft is not operating such as during passenger loading and unloading and/or extended period of down time at a gate 44 or other parking area, the cryogenic fuel will continue to boil off at some rate. Depending on ambient conditions and the duration of the down time, losses of fuel due to transformation of the liquid fuel to gaseous form can be significant. The example disclosed reprocessing system 20 collects the boil off gas fuel and transforms the collected gaseous fuel into liquid form for storage and eventual reuse.

The example aircraft 22 includes cryogenic fueled turbine engines 24. Each of the turbine engines 24 include a compressor section 26, combustor section 28 and a turbine section 30 in flow series. Inlet air is compressed in the compressor section 26 and communicated to the combustor section 28 for mixing with a cryogenic fuel and ignited to generate a high energy gas flow that expands through the turbine section 30 to drive the compressor 26 and a propulsor.

The aircraft 22 includes a fuel system 32 that distributes cryogenic fuel to each of the engines 24. In one example embodiment, the cryogenic fuel is hydrogen-based fuel. The hydrogen-based fuel may be hydrogen and/or be derived from hydrogen containing compounds such as ammonia. In another example embodiment, the cryogenic fuel is a liquid natural gas. It should be appreciated that although hydrogen, ammonia and liquid natural gas are disclosed by way of example, other cryogenic fuels could be utilized and are within the scope and contemplation of this disclosure.

A cryogenic fuel tank 34 stores fuel onboard the aircraft 22 in liquid form. Cryogenic fuels such as hydrogen and/or ammonia are liquid at temperatures well below ambient conditions. Accordingly, the cryogenic fuel tank 34 is configured to maintain the cryogenic fuel at temperatures and pressures that maintain the fuel in the liquid phase. The liquid fuel communicated to the engines in the fuel system 32 are typically heated to gaseous phase prior to injection into the combustion section 24. Additionally, the cryogenic fuel can be utilized as a cooling medium for other engine and/or aircraft systems and therefore may change phase during typical engine operation.

Because the cryogenic fuel is a gas at ambient temperatures, some of the liquid fuel will boil off and transform into a gaseous phase. The example fuel system 32 includes a gas collection system 36 that collects the boil off gas and routes collected gas to eventually be utilized in the combustor section 26 when the engines 24 are operating. However, when the engines 24 are not operating, such as for passenger loading and unloading and other extended periods of inactivity, the collected gas does not have an immediate use and can build up. Exhausting the boil off gas to atmosphere is not a desirable option as the boil off can be substantial and result in a significant loss of fuel.

In one disclosed example, the refueling system 20 includes a fuel reprocessing system 52 where gas collected from the aircraft 22, is transformed into liquid form and either stored in a liquid fuel tank 54 and/or directed back to the fuel tank 34 onboard the aircraft 22. The fuel reprocessing system 52 includes a pump 88 to facilitate communication of boil off gases from the aircraft.

The gas collection system 36 is part of the aircraft fuel system 32 and is in communication through an externally accessible outlet 38 to the ground based refueling system 20. The collected gas is communicated outside the aircraft 22 to the fuel reprocessing system 52 located at the aircraft gate 44 or other parking area or maintenance facility where an aircraft maybe parked for extended periods. Communication of the collected boil off gases may be facilitated by a pump 84 on-board the aircraft 22 and/or by the pump 88 of the reprocessing system 52.

The fuel reprocessing system 52 may be a ground based and mounted system that is powered by a ground-based power source 46. The fuel reprocessing system 52 may also be part of a mobile vehicle 64. In some embodiments, the mobile vehicle 64 may include one or more of a fuel processing system 52, a liquid fuel tank 54 and a gas fuel tank 56. The mobile vehicle 64 may further include a pumping system 86 for drawing in boil off gas and pumping out liquid fuel.

In one disclosed example embodiment, the aircraft 22 includes a portion of the gas collection system 36 and couples to a ground-based portion of the gas collection system within the mobile vehicle 64 through an outlet coupling 38 disposed on an externally accessible location of the aircraft 22. A conduit 66 extends from the outlet coupling 38 to the gas collection system 36 and the fuel tank 34. The example conduit 66 is defined by one or more structures that together convey a fluid from one point to another. For example, a conduit conveying fluid from point A to point B may include one of, or a combination of: a conduit, an aperture defined through a part of an engine, a filter, a pump, and so on, depending on the application.

The systems onboard the aircraft 22 are powered through an electrical connection 42 to the ground based power source 46. The electrical connection 42 is disposed at an externally accessible location on the aircraft 22. In another disclosed example embodiment, the aircraft gas collection system 36 is coupled directly to the ground-based fuel reprocessing system 52 at the gate 44 or other parking area.

A ground mounted fuel tank 54 includes an inlet 58 for receiving liquefied fuel from the mobile vehicle 64. The fuel tank 54 further includes an outlet 60 and fuel pump 90 for communicating fuel back to the aircraft 22. The aircraft 22 includes an inlet 40 for receiving fuel in the liquid form.

The fuel processing system 52 includes the components necessary to transform the gaseous fuel into a liquid form. The components may include cooling systems and pumps to generate the desired temperatures and pressures needed to transform the gas into a liquid form. In another example embodiment, the components required for transforming cryogenic fuel into the liquid phase are provided on the mobile vehicle 64.

The example refueling system 20 includes both a liquid fuel tank 54 and a gas phase fuel tank 56. Fuel in the gas phase collected from the aircraft 22 can be directly routed to the reprocessing system 52 or routed to the gas phase storage tank 56 for later processing and reliquification. The liquid fuel may simply be stored in the fuel tank 54 or may be communicated right back to the aircraft 22 as needed to provide fuel to the aircraft for operation.

Conduits 50 and 62 provide for communication of fuel to and from the aircraft 22. In one disclosed embodiment, the conduit 52 is coupled to the externally accessible outlet 38 of the aircraft to communicate gas phase cryogenic fuel to the fuel reprocessing system 52. The conduit 62 provides for communication of liquid fuel back to the aircraft fuel tank 34. In another disclosed embodiment, gas phase cryogenic fuel may be communicated to the mobile vehicle 64 through conduit 48. The gaseous phase fuel may be transformed to a liquid form in the mobile vehicle 64 and communicated to the fuel tank 54 and eventually back to the aircraft 22. Alternatively, fuel in a liquid form may be communicated directly back to the aircraft fuel tank 34 from the mobile vehicle 64.

In one example embodiment, a portion of the captured boil off gas is communicated to a fuel cell system 80 that is disposed off the aircraft 22. The fuel cell system 80 generates electric power from the boil off gas captured from the aircraft 22 and an oxygen containing flow 82. The oxygen containing flow 82 may be communicated from a storage tank or drawn from other sources such as the ambient environment. The example fuel cell system 80 is shown schematically and may include thermal management devices, fuel pumps, oxygen storage conduits, turbo-expanders and any other devices utilized to efficiently generate power from the fuel cell system 80. Although, the fuel cell 80 is disclosed by way of example, other power generating devices that use the captured boil off gas to generate power may also be utilized and are within the contemplation and scope of this disclosure.

Figure 2:
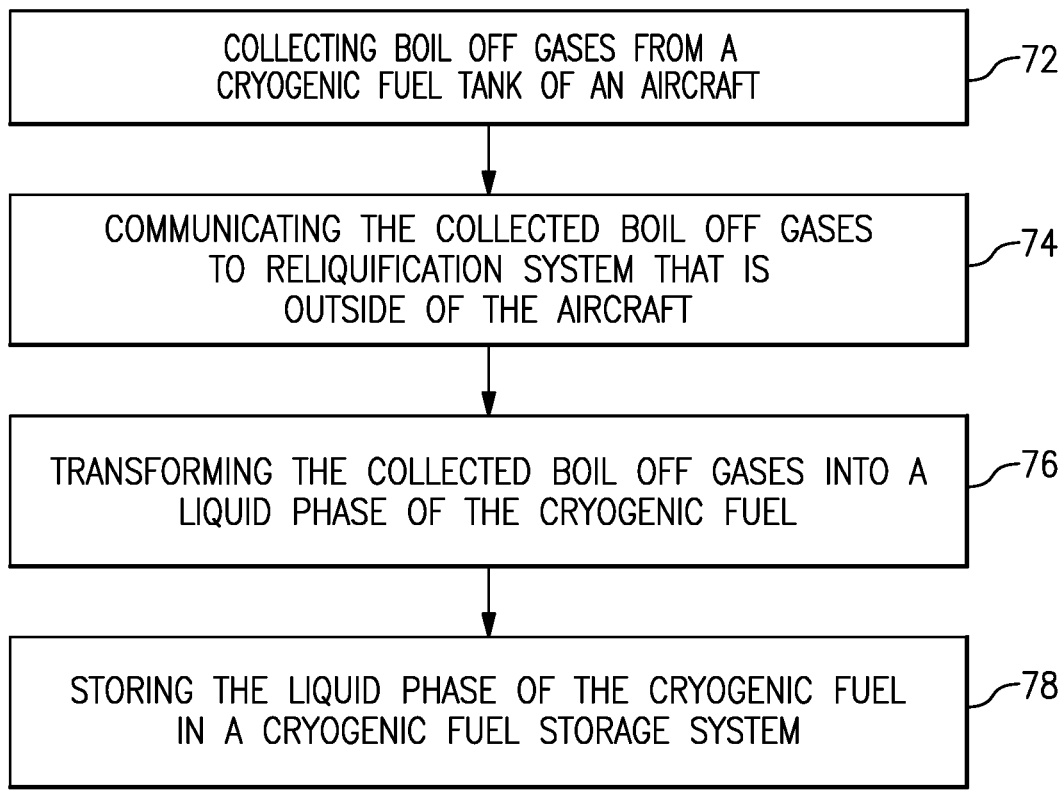
FIG. 2 is a flow chart of an example method of recovering boil off cryogenic fuel from a cryogenic fueled aircraft.

Referring to FIG. 2, with continued reference to FIG. 1, a flow diagram of an example disclosed method of recovering boil off gases from an aircraft cryogenic fuel system is schematically shown and indicated at 70. In operation, boil off gas is first collected by the gas collection system disposed on the aircraft 22 as part of the aircraft fuel system 32. In one disclosed embodiment, power to operate the gas collection system 36 on-board the aircraft during inactivity is provided by a ground-based power source 46. The gas collection system 36 may operate with aircraft power during aircraft operation, however during periods of where the engine is not operating, power can be communicated to the aircraft to provide any required power. Accordingly, the boil off gas is captured and collected as indicated at 72.

The boil off gases are communicated to a reliquification system outside the aircraft 22 as indicated at 74. Communication of gases is provided by coupling a conduit (e.g., conduit 48 or 50) to an externally accessible outlet 38 of the aircraft 22. The conduits 48, 50 are provided depending on where the gas is to be transformed. In one example embodiment, the ground-based fuel reprocessing system 52 is coupled through conduit 50 to the outlet 38. In another example embodiment, the mobile vehicle 64 based fuel reprocessing system is coupled through conduit 48 to the outlet 38.

The communicated boil off gases are transformed into liquid phase as indicated at 76. In either the mobile vehicle located or ground based reprocessing systems 52, any power needed to perform the phase transformation is provided by the land-based power source 46. Moreover, locating the reprocessing system 52 separate from the aircraft 22, reduce complexity of the aircraft fuel system 32.

Once the fuel is returned to liquid form, it is stored as indicated at 78. The fuel may be stored on the aircraft 22 or in the example ground-based fuel tank 54 according to one example embodiment. The liquid fuel may also be communicated back to the aircraft 22. Additionally, the gases fuel may simply be off-loaded from the aircraft and stored in gas form in the ground-based fuel tank 56 adapted for holding the cryogenic fuel in gaseous form. The stored gaseous phase fuel can be stored for later reprocessing and liquification.

Accordingly, the disclosed aircraft refueling systems provide for the realization of the potential benefits provided by the use of alternate fuels while reducing waste by capturing fuel that may otherwise be lost.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A cryogenic fueled aircraft propulsion maintenance system comprising:
  a fuel system of an aircraft, the fuel system comprising a cryogenic fuel tank configured to maintain the fuel within the cryogenic fuel tank in a liquid phase;
  a gas collection system where boil off gas from the fuel system is collected, wherein a portion of the gas collection system is external to the aircraft and in communication with the cryogenic fuel tank; and
  a fuel reliquification system configured to receive boil off gas from the gas collection system and transform the boil off gas into a liquid phase as liquid fuel, wherein the fuel reliquification system is located outside of the aircraft;
  an externally accessible power connection for communicating power from a source external to the aircraft to the fuel system and the gas collection system on the aircraft; and
  a pump configured to communicate boil off gas from the aircraft to the fuel reliquification system, wherein the power source external to the aircraft provides power to the pump.

2. The cryogenic fueled aircraft propulsion maintenance system as recited in claim 1, further comprising a conduit within the aircraft extending from an externally accessible outlet to the cryogenic fuel tank for communicating boil off gas outside the aircraft.

3. The cryogenic fueled aircraft propulsion maintenance system as recited in claim 2, wherein the gas collection system is mounted within the aircraft proximate the cryogenic fuel tank and the conduit extends to the gas collection system from the externally accessible outlet.

4. The cryogenic fueled aircraft propulsion maintenance system as recited in claim 1, wherein a portion of the gas collection system is external to the aircraft and in communication with the cryogenic fuel tank.

5. The cryogenic fueled aircraft propulsion maintenance system as recited in claim 1, wherein the cryogenic fuel comprises one of hydrogen, ammonia, or liquid natural gas.

6. A cryogenic fueling system for an aircraft comprising:
a fuel reliquification system where collected boil off gas is transformed into a cryogenic fuel in a liquid phase;
a coupling disposed on an externally accessible location of the aircraft and configured for receiving boil off gas from a cryogenic fuel tank configured to maintain the cryogenic fuel in a liquid phase on board the aircraft; and
a cryogenic fuel storage system for receiving and storing the liquid fuel from the fuel reliquification system; and
a gas collection system including a portion disposed on-board the aircraft where boil off gas from a hydrogen-based fuel system is collected, the gas collection system including the coupling configured for connecting to an externally accessible location of an aircraft for receiving a gas phase of a hydrogen-based fuel; and
an externally accessible power connection for communicating power from a source external to the aircraft to the fuel system and the gas collection system on the aircraft.

7. The cryogenic fueling system for an aircraft as recited in claim 6, wherein the gas collection system and fuel reliquification system are ground based and fixed relative to an airport gate or other parking area.

8. The cryogenic fueling system for an aircraft as recited in claim 6, wherein the gas collection system and the fuel reliquification system are supported on a mobile vehicle.

9. The cryogenic fueling system for an aircraft as recited in claim 6, wherein the cryogenic storage system includes a portion configured for storing a cryogenic fuel in a gaseous phase.

10. The cryogenic fueling system for an aircraft as recited in claim 6, including a fuel pumping system for communicating a cryogenic fuel to an aircraft fuel system.

11. The cryogenic fueling system for an aircraft as recited in claim 6, including a power system that is configured to couple to the aircraft fuel system for providing power independent of aircraft power to power the aircraft fuel system, the gas collection system and the fuel reliquification system.

12. The cryogenic fueling system for an aircraft as recited in claim 6, including a power generation system configured to generate power utilizing the boil off gas from the aircraft.

* * * * *